(12) United States Patent
Flögel et al.

(10) Patent No.: US 6,363,790 B1
(45) Date of Patent: Apr. 2, 2002

(54) PRESSURE SENSOR

(75) Inventors: Karl Flögel; Thomas Uehlin, both of Schopfheim (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/418,927

(22) Filed: Oct. 15, 1999

Related U.S. Application Data
(60) Provisional application No. 60/109,817, filed on Nov. 25, 1998.

(30) Foreign Application Priority Data
Oct. 23, 1998 (EP) .............................. 98120077

(51) Int. Cl.[7] .......................... G01L 19/04; G01L 7/08; H01G 7/00
(52) U.S. Cl. ......................... 73/708; 73/715; 361/283.4
(58) Field of Search ......................... 73/708, 716, 717, 73/718, 719, 720, 721, 722, 715, 756; 361/283.4

(56) References Cited

U.S. PATENT DOCUMENTS

| | | | | |
|---|---|---|---|---|
| 4,994,781 A | * | 2/1991 | Sahagen | 338/47 |
| 5,712,428 A | | 1/1998 | Schleiferbock | 73/708 |
| 5,824,909 A | * | 10/1998 | Kathan et al. | 73/706 |

FOREIGN PATENT DOCUMENTS
EP 0 757 237 2/1996

* cited by examiner

Primary Examiner—Benjamin R. Fuller
Assistant Examiner—Abdullahi Aw-Musse
(74) Attorney, Agent, or Firm—Bose McKinney & Evans LLP

(57) ABSTRACT

The invention is concerned with a pressure sensor which avoids temperature hysteresis effects caused on account of heat-induced expansions as a result of stresses between a ceramic pressure-measuring cell and a metallic housing.

The inventive pressure sensor (100) for determining the pressure of a process medium comprises a metallic housing (110), which is open to a process medium and has a continuous hole (111) for accommodating the ceramic pressure-measuring cell (120), the pressure-measuring cell (120) comprising a ceramic base body (122) and a ceramic diaphragm (121), which is fitted thereon and is exposed to the process medium, and also suitable means (124a, 124b, 130), which supply an electrical signal which can be picked off and corresponds to the process pressure acting on the diaphragm (121). The pressure-measuring cell (120) is fixed axially in a resilient manner in the housing (110) by means of a metallic fixing device (150) which acts on a non-metallic intermediate body (140), which is provided between the pressure-measuring cell (120) and the fixing device (150) and can be moved radially at least with respect to the fixing device (150).

11 Claims, 2 Drawing Sheets

PRESSURE SENSOR

This application claims benefit of provisional application Ser. No. 60/109,817 filed Nov. 25, 1998.

BACKGROUND OF THE INVENTION

The invention relates to a pressure sensor for determining the pressure of a process medium. The pressure sensor has a ceramic pressure-measuring cell with a diaphragm which is exposed to the process medium, is axially fixed in a metallic housing and generates an electrical signal which can be picked off and corresponds to a deflection of the diaphragm caused by the pressure.

Usually, with pressure sensors of this type the ceramic pressure-measuring cell is pressed against a stop by means of a metallic fixing device in the housing, said fixing device being directly in contact with said pressure-measuring cell. Temperature changes result in undesirable mechanical stresses between the pressure-measuring cell and the fixing device (and also the housing), said stresses originating from different thermal expansion coefficients of the materials used. For example, rising temperatures cause the metal housing and the metallic fixing device, serving to fix the pressure-measuring cell, to expand to a greater extent than the ceramic pressure-measuring cell. Displacements of individual parts relative to one another can likewise occur, said parts changing their relative position with respect to one another. In some cases these displacements have not been fully reversible in the course of a subsequent temperature decrease, and permanent deformations have remained as a result. Such deformations result in an undesirable temperature hysteresis which falsifies the measured pressure value or values.

DE-A 42 34 290 describes a ceramic pressure-measuring cell which is exposed directly to a process medium and is fixed in a metallic housing by means of a metallic fixing device, a so-called fixing sleeve. The subject matter of DE-A 42 34 290 serves to support the ceramic pressure-measuring cell radially and to relieve it to the greatest possible extent of axial stresses due to the fixing in the housing. For this purpose, DE-A 42 34 290 also proposes (inter alia) a ceramic disk (called "ceramic supporting body" therein) which is arranged in the axial direction between the ceramic pressure-measuring cell and the metallic fixing device (called "fixing sleeve" therein) and whose thermal expansion coefficient corresponds to that of the pressure-measuring cell.

The subject matter of DE-A 42 34 290 has the disadvantage, however, that the ceramic disk mentioned is fixedly joined to the pressure-measuring cell by means of active braze or glass solder. Different heat-induced expansions of the materials that adjoin one another cause, however, as outlined above, undesirable radial stresses between the metallic fixing device and the ceramic disk. Owing to its strong brazed fixture connection to the pressure-measuring cell, the ceramic disk passes the thermally induced radial stresses on to the pressure-measuring cell, which leads to the abovementioned falsifications of the measured pressure values and/or to temperature hysteresis effects.

Therefore, it is an object of the invention to provide a pressure sensor which avoids temperature hysteresis effects caused by stresses between the pressure-measuring cell and the housing generated by heat-induced expansions.

SUMMARY OF THE INVENTION

In order to achieve this object, a first variant of the invention consists in a pressure sensor for determining the pressure of a process medium, having a metallic housing, which is open to the process medium and which has a throughhole for inserting a ceramic pressure-measuring cell therein, which comprises a ceramic substrate and a ceramic diaphragm, which is fitted thereon and is exposed to the process medium, and also means, which supply an electrical signal which can be picked off and corresponds to a deflection of the diaphragm caused by the pressure acting thereon, whereby the diaphragm is supported axially in a resilient manner on a first stop in the housing and the substrate is supported on a non-metallic intermediate body, which is retained by a metallic fixing device in the housing, and whereby the intermediate body is movable radially with respect to the metallic fixing device.

A preferred embodiment of the first variant of the invention provides a pressure sensor in which the metallic fixing device is a metallic ring or a disk which is fixed in a releasable manner in the housing.

In order further to achieve the object, a second variant of the invention consists in a pressure sensor for determining the pressure of a process medium, having a metallic housing, which is open to the process medium and which has a throughhole for inserting a ceramic pressure-measuring cell therein, which comprises a ceramic substrate and a ceramic diaphragm, which is fitted thereon and is exposed to the process medium, and also means, which supply an electrical signal which can be picked off and corresponds to a deflection of the diaphragm caused by the pressure acting thereon, whereby the diaphragm is supported axially in the housing in a resilient manner on a process connection and the substrate is supported on a non-metallic intermediate body, which is retained by a metallic fixing device in the housing, and the intermediate body is movable radially with respect to the metallic fixing device.

In a preferred embodiment of the first or second variant of the invention, the intermediate body of the pressure sensor consists of a material whose thermal expansion coefficient corresponds to that of the ceramic substrate of the pressure-measuring cell.

In a particular embodiment of this embodiment, the intermediate body is composed of ceramic material.

According to a further preferred embodiment of the first or second variant of the invention, the intermediate body has a centering part, which at least partially encompasses the pressure-measuring cell radially for the purpose of centering the pressure-measuring cell and the intermediate body in the housing.

According to still another preferred embodiment of the first or second variant of the invention, recesses are provided in a first end face of the intermediate body, said first end face resting on the pressure-measuring cell, through which recesses electrically conductive connections are routed. The advantage is that shields against interfering electromagnetic irradiation of an electronic portion and of the pressure-measuring cell are thereby connected conductively to one another in a simple manner.

According to still another preferred embodiment of the first or second variant of the invention, a film made of cold-flowing material is arranged between the intermediate body and the fixing device. This embodiment minimizes the friction between the fixing device and the intermediate body of the pressure sensor, said friction being caused by heat-induced expansions.

A further advantage of the invention is that it not only enables stresses which occur in the radial direction and act on the pressure-measuring cell to be relieved but also permits, in a simple manner, the control of stresses which act on the pressure-measuring cell in the axial direction caused by different heat-induced expansions. By a suitable choice of the axial extent of the intermediate body (height and/or thickness of the intermediate body) taking account of resilient and/or elastic properties of a seal with respect to the process medium, axial loading on the pressure-measuring cell can also be kept as low as possible and mostly constant.

BRIEF DESCRIPTION OF THE DRAWING

The invention will now be described and explained using preferred embodiments which are illustrated in the figures of the drawing.

DETAILED DESCRIPTION OF PREFERRED EMBODIMENTS

Figure 1:
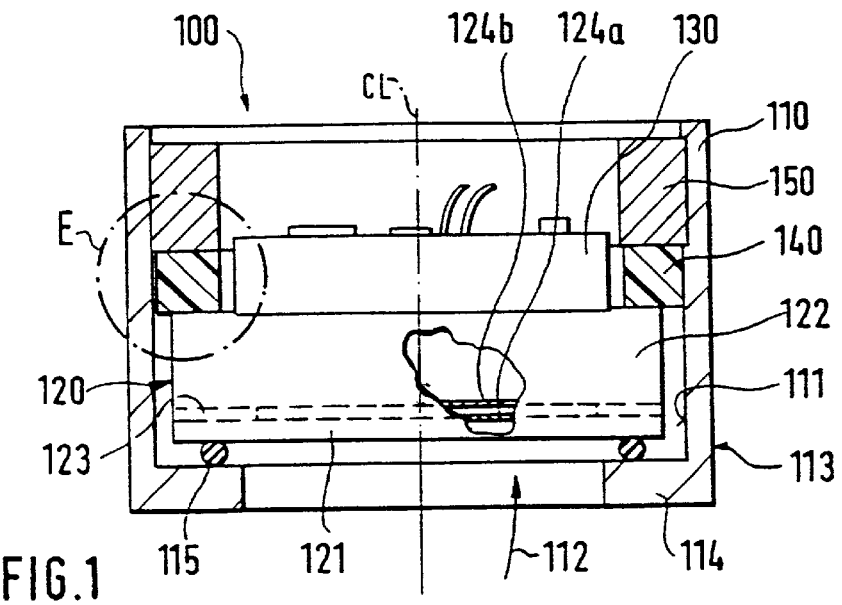
FIG. 1 schematically shows, in vertical section, a first variant of the pressure sensor, with a partly broken-open pressure-measuring cell, and a first variant of an intermediate body.

FIG. 1 illustrates a pressure sensor 100, which comprises a metallic housing 110 with a throughhole 111, a ceramic pressure-measuring cell 120 being retained therein. This pressure-measuring cell is exposed directly to a process medium, which is not illustrated here for the sake of simplicity and acts on a diaphragm 121 of the pressure-measuring cell 120 via an inlet opening 112 in the front region 113 of the hole 111. The pressure-measuring cell 120 is preferably a capacitive pressure-measuring cell, this being illustrated by the schematically shown electrodes 124a, 124b on the diaphragm 121 and on substrate 122. At its edge, the diaphragm 121 is brazed to substrate 122, preferably by means of an active braze 123. However, it is equally possible to use a piezoresistive pressure-measuring cell instead of the capacitive measuring cell for the pressure sensor 100.

A measurement signal which can be picked off on the output side of the pressure-measuring cell 120 and corresponds to the pressure of the process medium acting on the diaphragm 121 is conditioned in an electronic portion 130, which is illustrated only schematically in this case.

The pressure-measuring cell 120 is resiliently mounted in the housing 110 on a first stop 114, which faces the process medium and is formed by a reduction of the free cross section of the throughhole 111 in the housing 110. The interior of the housing 110 is sealed off by means of a seal 115, which is arranged between the pressure-measuring cell 120 and the first stop 114 and simultaneously ensures the resilient properties of the support of the pressure-measuring cell 120. As illustrated in FIG. 1, the seal 115 is, for example, an elastic O-ring seal, but this is not absolutely necessary for the realization of the invention, with the result that it is also possible to use any other resilient seal (and any form of seal).

An intermediate body 140 rests on that side of the substrate 122 of the pressure-measuring cell 120 which is remote from the diaphragm, said intermediate body in turn being retained by a metallic fixing device 150 in the housing 110. The intermediate body 140 consists of non-metallic material having a thermal expansion coefficient which preferably corresponds to that of the ceramic substrate 122 of the pressure-measuring cell 120.

Although various non-metallic materials for the intermediate body are possible for the invention, provided that their thermal expansion coefficients correspond to that of the substrate 122, an intermediate body 140 made of a ceramic material is provided in the preferred embodiment. This material may, but does not absolutely have to, correspond to that of the substrate 122.

The metallic fixing device 150, which acts axially on the intermediate body 140 and thus the pressure-measuring cell 120, is fixed in a releasable manner to or in the housing 110. The fixing device 150 is preferably a ring, as illustrated in FIG. 1. However, it may also be a disk which, like the ring, is composed of brass, for example, and is provided with an external thread which can be screwed into a corresponding internal thread in the housing 110, to be more precise, in a region of the hole 111 which is remote from the process medium. The two threads are not illustrated, in order to simplify FIG. 1.

A designated center line CL illustrates that the housing 110, the hole 111, the pressure-measuring cell 120, the intermediate body 140 and the fixing device 150 are of rotationally symmetrical design in the preferred embodiment of FIG. 1. If electrical supply leads (not illustrated here) to the electronic section 130 are used, it is advantageous, as illustrated in FIG. 1, for the intermediate body 140 and the fixing device 150 to be of annular design.

Figure 2:
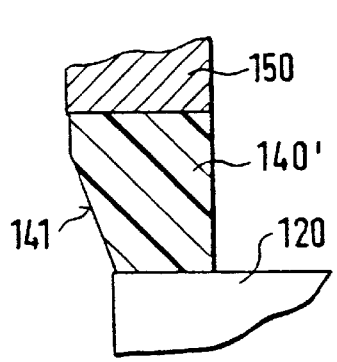
FIG. 2 shows, in section and in an enlarged manner, a second variant of the intermediate body in accordance with the detail designated by "E" in FIG. 1.

FIG. 2 diagrammatically illustrates the detail E from FIG. 1, which represents, in a simplified form and on an enlarged scale with respect to FIG. 1, a second variant of an intermediate body 140' arranged between the pressure-measuring cell 120 and the fixing device 150. This second variant of the intermediate body 140' differs from the first variant of the intermediate body 140 according to FIG. 1 by a bevel 141 facing the housing 110. A transition from the diameter of the pressure-measuring cell 120 to the larger internal diameter of the hole 111 in the housing 110 is realized in a simple manner by means of this bevel.

Figure 3:
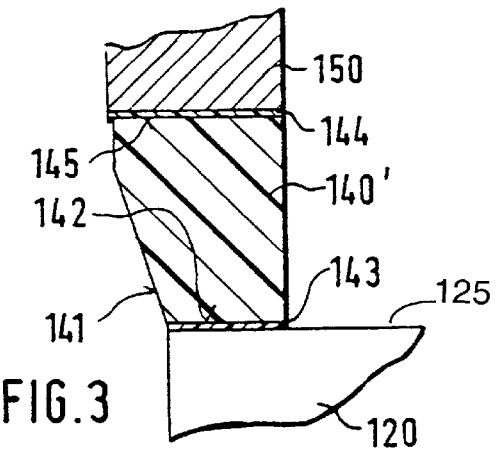
FIG. 3 shows, in an enlarged manner, the intermediate body according to FIG. 2 with friction-reducing films provided at interfaces.

FIG. 3 illustrates a particular development of the arrangement according to FIG. 2. A thin layer made of cold-flowing material, for example a fluoroplastic, is fitted between a first end face 142 of the intermediate body 140' and a corresponding surface 125 of the pressure-measuring cell 120. This layer is preferably a first film 143 made of polyfluoroethylene (PTFE) which is advantageously applied on the intermediate body 140', in particular on the first end face 142 thereof.

It is more important, however, to provide a second film 144 made of cold-flowing material, for example a fluoroplastic, on a second end face 145 of the intermediate body 140' in order there, too, to minimize the friction between the fixing device 150 and the intermediate body 140' in the event of heat-induced expansions that occur, and to ensure the displaceability of intermediate body 140' and fixing device 150 relative to one another under all circumstances and to avoid irreversible changes in position. The second film 144 preferably cosists of polyfluoroethylene (PTFE), like the first film 143.

Figure 4:
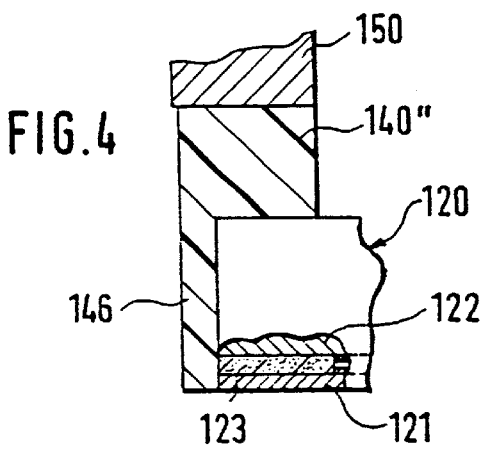
FIG. 4 shows, in an enlarged manner, a third variant of the intermediate body in accordance with the detail designated by "E" in FIG. 1.

FIG. 4 shows, likewise schematically, the detail E from FIG. 1 and, in a simplified form and on an enlarged scale with respect to FIG. 1, a third variant of an intermediate body 140". For the purpose of simplification, here, too, the housing 110, the housing wall illustrated in the detail E of FIG. 1 and also that part of the electronic section 130 which is situated in the detail are not illustrated. This third variant of the intermediate body 140" differs from the other two variants represented in FIGS. 1 to 3 by a centering part 146, which is provided on the intermediate body 140" and at least partially encloses or encompasses the pressure-measuring cell 120 radially. The advantage of such an intermediate body 140" with centering part 146 is that the pressure-measuring cell 120 can thereby be better centered in the housing 110 during assembly. In addition, the non-metallic centering part 146 can ensure electrical insulation with respect to the metallic housing 110 if the diaphragm 121 of the pressure-measuring cell 120 is fixed on the substrate 122 by means of a (metallic) active brazed joint 123.

Figure 5:
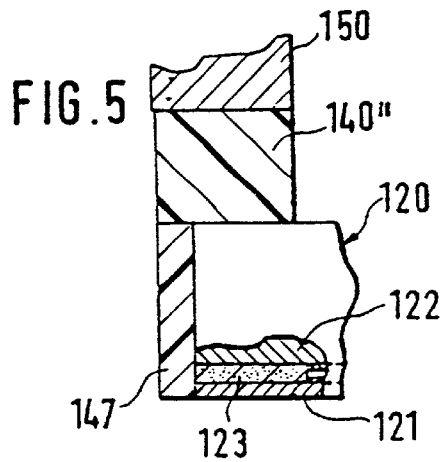
FIG. 5 shows, in an enlarged manner, a particular embodiment of the intermediate body according to FIG. 4.

FIG. 5 schematically illustrates a particular embodiment of the inventive intermediate body 140" according to FIG. 4. This embodiment of the intermediate body 140" differs from that illustrated in FIG. 4 by the fact that the centering part is designed as a separate centering part 147. It may consist of a plastic which is less expensive than ceramic.

Figure 6:
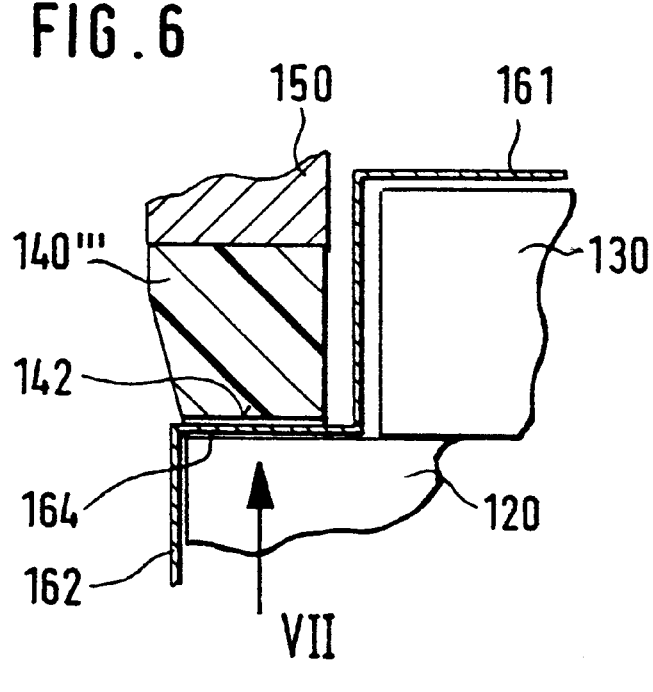
FIG. 6 shows, in an enlarged manner, a fourth variant of the intermediate body in accordance with the detail designated by "E" in FIG. 1.

FIG. 6 is a schematic illustration of a fourth variant of an intermediate body 140'" in connection with the detail E of FIG. 1. For the sake of simplicity, the basic cross-sectional form of the intermediate body 140' illustrated in FIG. 2 has been chosen for FIG. 6, but this does not signify any restriction. In principle, any other desired variant of the intermediate body is also suitable for the fourth variant explained below.

Figure 7:
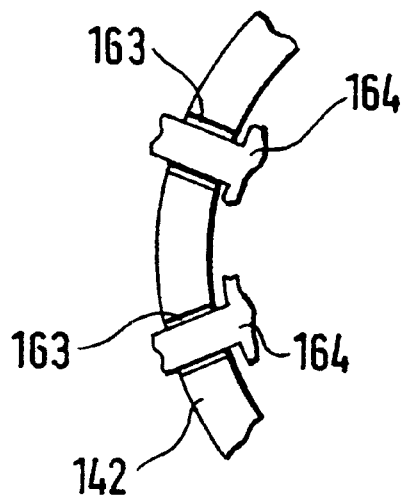
FIG. 7 shows schematically a partial view of a surface of the intermediate body according to FIG. 6, said surface being in contact with the pressure-measuring cell, as seen from the direction designated by "VII" in FIG. 6.

The special feature of the fourth variant of the intermediate body 140'" of FIG. 6 is that it is designed for a pressure sensor 100 with an internal electromagnetic shield 161, which surrounds the electronic section 130 and is essentially in the form of a cover. In order to be able to connect such a shield 161 of the electronic section 130 conductively to a corresponding shield 162 for the pressure-measuring cell 120, continuous recesses 163 are provided, as shown by FIG. 7, in the first end face 142 of the intermediate body 140'", which recesses are as shallow as possible and through which recesses electrical contact leads 164 are routed which connect the shields 161 and 162 to one another. If desired, it is also possible, as mentioned with respect to FIG. 3 that a first film 143 made of friction-reducing material is applied to the raised parts of the first end face 142 which are in direct contact with the pressure-measuring cell 120.

Figure 8:
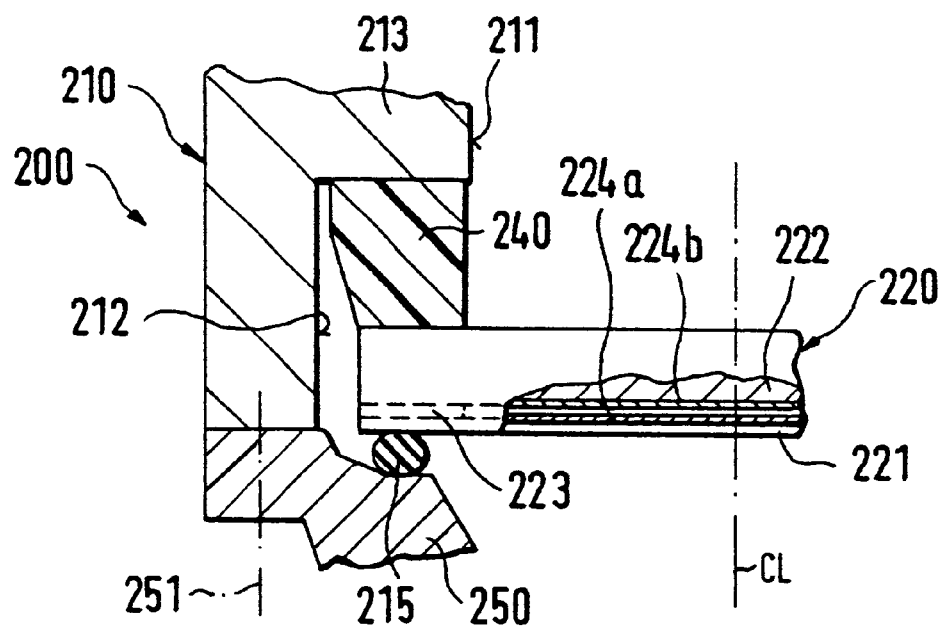
FIG. 8 shows schematically and in a simplified manner in vertical section, a second variant of the pressure sensor with a process connection.

FIG. 8 schematically illustrates a preferred embodiment of a second variant of the invention. A pressure sensor 200 is designed particularly for a simple change or replacement of a pressure-measuring cell 220 to be performed from the process side. In FIG. 8, a hole 211 in a housing 210 has a diameter which is greater than the external diameter of the pressure-measuring cell 220 only in that part of said hole 211 which is on the process side. This part 212 of the hole 211 on the front side ends within the housing 210 at a rear, second stop 213, which in turn serves to support an intermediate body 240 for which, for the sake of simplicity, the cross-sectional form of the embodiment according to FIG. 2 has been chosen and which is arranged between the second stop 213, serving as fixing device, and the pressure-measuring cell 220. The latter is retained axially and resiliently in the housing 210 of the pressure sensor 200 by means of a process connection 250, which is fixed to the housing 210 by releasable fixing means, preferably screws 251.

The pressure-measuring cell 220 is preferably a capacitive pressure-measuring cell, which is illustrated by the electrodes 224a, 224b shown schematically on the diaphragm 221 and on the substrate 222. At its rim, the diaphragm 221 is brazed to a substrate 222, preferably by means of an active braze 223. However, it is equally well possible to use a piezoresistive pressure-measuring cell instead of the capacitive pressure-measuring cell for the pressure sensor 200.

A measurement signal which can be picked off on the output side of the pressure-measuring cell 220 and corresponds to the pressure of the process medium acting on the diaphragm 221 is processed in an electronic section, which is not illustrated here for the sake of simplicity.

As an alternative to the second stop 213 which is represented in FIG. 8 and is formed by a sudden diameter change of the hole 211 in the housing 210, it is alternatively possible, if only a single diameter is provided for reasons of production technique, to use the annular fixing device 150 which is illustrated in FIG. 1 and is screwed into the hole in a corresponding manner.

The sealing of the interior of the housing 210 against the process medium is ensured by a resilient and/or elastic seal 215 arranged between the pressure-measuring cell 220 and the process connection 250. This seal 215 may be, for example, an O-ring or another resilient, annular seal which ensures axial and resilient clamping of the pressure-measuring cell 220 in the housing 210.

For the embodiment of the invention which is illustrated in FIG. 8 and is particularly suitable for process-side mounting of the pressure-measuring cell 220, it is also possible to use the intermediate body 140" represented in FIG. 5 with a separate centering part 147, for example made of plastic. It is likewise possible to use an intermediate body according to FIG. 3 or FIG. 6 for the second variant of the invention as illustrated in FIG. 8.

The invention is not restricted to the embodiments illustrated in FIGS. 1 to 8. It is conceivable and possible with no great effort for a person skilled in the art to combine the different embodiments mentioned above and illustrated in the drawing with one another in an expedient, yet free manner.

What is claimed is:
1. A pressure sensor for determining the pressure of a process medium, comprising:

a metallic housing, which is open to the process medium and which has a continuous hole for accommodating a ceramic pressure-measuring cell, the ceramic pressure-measuring cell including
a ceramic base body and
a ceramic diaphragm, which is fitted thereon and is exposed to the process medium, and
means for supplying an electrical signal which can be picked off, said electrical signal corresponding to flexing caused by the pressure acting on the diaphragm wherein
the diaphragm is resiliently mounted in the housing on a first stop;
the base body is supported on a non-metallic intermediate body, which
is retained by a metallic fixing device in the housing, and
the intermediate body can be moved radially with respect to the metallic fixing device; and
wherein the intermediate body is composed of a material whose thermal expansion coefficient corresponds to that of the ceramic base body of the pressure-measuring cell.

2. The pressure sensor (100) as claimed in claim 1, in which the metallic fixing device (150) is a metallic ring or a disk which is fixed in a releasable manner in the housing (110).

3. A pressure sensor for determining the pressure of a process medium, comprising:
a metallic housing, which is open to the process medium and
which has a continuous hole for accommodating a ceramic pressure-measuring cell, the ceramic pressure-measuring cell including
a ceramic base body and
a ceramic diaphragm, which is fitted thereon and is exposed to the process medium, and
means for supplying an electrical signal which can be picked off, said electrical signal corresponding to flexing caused by the pressure acting on the diaphragm wherein
the diaphragm is retained axially and resiliently in the housing by a process connection;
the base body is supported on a non-metallic intermediate body, which
is retained by a metallic fixing device in the housing, and
the intermediate body can be moved radially with respect to the fixing device; and
wherein the intermediate body is composed of a material whose thermal expansion coefficient corresponds to that of the ceramic base body of the pressure-measuring cell.

4. The pressure sensor as claimed in claim 1, in which the intermediate body is composed of ceramic material.

5. The pressure sensor as claimed in claim 1, in which the intermediate body has a centering part, which at least partially encompasses the pressure-measuring cell radially for the purpose of centering the pressure-measuring cell and the intermediate body in the housing.

6. The pressure sensor as claimed in claim 3, in which the intermediate body has a centering part, which at least partially encompasses the pressure-measuring cell radially for the purpose of centering the pressure-measuring cell and the intermediate body in the housing.

7. The pressure sensor as claimed in claim 1, in which cutouts are provided in a first end face of the intermediate body, said first end face resting on the pressure-measuring cell, through which cutouts electrically conductive connections are routed.

8. The pressure sensor as claimed in claim 3, in which cutouts are provided in a first end face of the intermediate body, said first end face resting on the pressure-measuring cell, through which cutouts electrically conductive connections are routed.

9. The pressure sensor as claimed in claim 1, in which a film made of cold-flowing material is arranged between the intermediate body and the fixing device.

10. The pressure sensor as claimed in claim 3, in which a film made of cold-flowing material is arranged between the intermediate body and the fixing device.

11. The pressure sensor as claimed in claim 3, in which the intermediate body is composed of a ceramic material.

* * * * *

UNITED STATES PATENT AND TRADEMARK OFFICE
CERTIFICATE OF CORRECTION

PATENT NO.    : 6,363,790 B1
DATED         : April 2, 2002
INVENTOR(S)   : Karl Flögel and Thomas Uehlin It is certified that error appears in the above-identified patent and that said Letters Patent is hereby corrected as shown below:

<u>Title page,</u>
Item [56], please add the following References Cited to the FOREIGN PATENT DOCUMENTS,

-- DE          4234290         4/14/94 --

Signed and Sealed this

Eighth Day of April, 2003

JAMES E. ROGAN
*Director of the United States Patent and Trademark Office*